US008608860B2

United States Patent
Villanova

(10) Patent No.: US 8,608,860 B2
(45) Date of Patent: Dec. 17, 2013

(54) ADHESIVE COMPOSITIONS CAPABLE OF COMPLETELY REMOVING ACARI, BACTERIA, MOTHS, TICKS, FLEAS FROM FABRICS AND ANIMAL'S HAIR

(75) Inventor: Maria Angela Villanova, Monza MB (IT)

(73) Assignee: Mugue S.A.S. di Villanova Maria Angela & C., Monza (IT)

( * ) Notice: Subject to any disclaimer, the term of this patent is extended or adjusted under 35 U.S.C. 154(b) by 341 days.

(21) Appl. No.: 12/849,070

(22) Filed: Aug. 3, 2010

(65) Prior Publication Data
US 2010/0293730 A1     Nov. 25, 2010

Related U.S. Application Data

(63) Continuation-in-part of application No. PCT/EP2009/051124, filed on Feb. 2, 2009.

(30) Foreign Application Priority Data

Feb. 4, 2008 (IT) ............................... MI2008A0162

(51) Int. Cl.
B08B 7/00 (2006.01)
(52) U.S. Cl.
USPC ............................ 134/6; 134/42; 15/104.002
(58) Field of Classification Search
USPC .................... 15/104.002; 134/6, 42
See application file for complete search history.

(56) References Cited

U.S. PATENT DOCUMENTS

| | | | | | |
|---|---|---|---|---|---|
| 4,815,232 | A | * | 3/1989 | Rawski | 43/136 |
| 6,455,138 | B1 | * | 9/2002 | Murano | 428/201 |
| 6,514,566 | B2 | * | 2/2003 | Mann et al. | 427/350 |
| 6,624,273 | B1 | * | 9/2003 | Everaerts et al. | 526/317.1 |
| 8,250,803 | B1 | * | 8/2012 | Kanno et al. | 43/114 |
| 2001/0037772 | A1 | * | 11/2001 | Huddleston | 119/626 |
| 2004/0058116 | A1 | * | 3/2004 | Sano et al. | 428/40.1 |
| 2004/0092632 | A1 | | 5/2004 | Schultz et al. | |
| 2004/0096491 | A1 | * | 5/2004 | Tateishi et al. | 424/449 |
| 2007/0169402 | A1 | * | 7/2007 | Jacobson | 43/114 |
| 2011/0016771 | A1 | * | 1/2011 | Crouse et al. | 43/136 |

OTHER PUBLICATIONS

International Search Report for International Application No. PCT/EP2009/051124 dated Jul. 23, 2009.

* cited by examiner

*Primary Examiner* — Bibi Carrillo
(74) *Attorney, Agent, or Firm* — Lucas & Mercanti, LLP

(57) ABSTRACT

A method for removing microorganisms and small insects from fabric or animal's hair comprising applying and removing an adhesive composition comprising at least one adhesive polymer and a plasticizer, wherein the amounts of this plasticizer range from about 5 to about 45% by weight of the total weight of the wet adhesive composition.

The adhesive composition used in the method of the invention thanks to the presence of high plasticizer concentrations are very fluid to allow said micro-organisms or small insects to be removed and, at the same time, they leave no residue on the fabric, or animal's hair.

The present invention further relates to adhesive compositions to be used in the method of the invention further containing active ingredients which are released from the adhesive composition during the step of removing the organisms from the fabric or the animal's hair.

12 Claims, 3 Drawing Sheets

ADHESIVE COMPOSITIONS CAPABLE OF COMPLETELY REMOVING ACARI, BACTERIA, MOTHS, TICKS, FLEAS FROM FABRICS AND ANIMAL'S HAIR

CROSS-REFERENCE TO RELATED APPLICATIONS

This application is a continuation-in-part of International Application No. PCT/EP2009/051124 filed on Feb. 2, 2009 which claims priority to and benefit of Italian Application No. MI2008A000162 filed on Feb. 4, 2008, the contents of which are incorporated herein by reference.

FIELD OF THE INVENTION

The object of the present invention is a method for removing acari moths, bacteria, ticks or fleas from fabrics and animal's hair.

STATE OF THE ART

A very high percentage of people in the world suffer from acarus allergy. People suffering from such a type of allergy have to undergo an appropriate therapy during the acute phases and constantly a proper prophylaxis.

Prophylaxis is essentially directed to eliminate carpets, floor coverings and curtains from housing places, in other words any type of material capable of retaining the dust and therefore even the acari.

It is then recommended to use expensive acari-preventing linings as well as to use even more expensive acari-preventing vacuum cleaners equipped with specific water filters or with permetrine-based acari-preventing spray, i.e. based on a chemical compound which, in some cases, is capable to get worse the allergy caused by secretion products of acari, such as faeces, or by decaying of acari carcasses.

All these prophylactic measures do not however lead to an improvement of the clinical picture, since they are not always capable to completely remove all the acarus colonies, moreover a new acarus colony is capable to replace the removed one, e.g. from sheets or pillow linings, since acari are present not only in the dust but even on the scalp and usually feed on dead skin residues which unavoidably settle on such types of fabric.

The need of a significantly more cost-effective way is thus felt, as compared to the already known ways mentioned above, which is capable to completely remove the acari and their secretion products and carcasses.

Furthermore, a need is felt for a device of a kind being capable not only to completely remove acari but also confer acari-repellency on the fabric from which acari have been removed, so that to oppose the taking root of new colonies.

Adhesive brushes for removing hairs comprised of a handle which ends with a pin around which a generally cardboard-made roll is arranged, on which a paper strip applied with an adhesive layer is wrapped, have been available on the market for several years.

Furthermore, the Applicant filed the Utility Model No. MI2003U0555 relating to adhesive brushes, wherein the adhesive layer contains a partially micro-encapsulated perfume which, by means of mechanical friction, is released into the place where the adhesive brush is applied.

In all cases, the marketed adhesive brushes which are particularly suitable for removing hairs or other residues showing relatively large dimensions, may not be considered as capable of completely removing small-sized organisms, such as bacteria, acari, moths, fleas or ticks.

Non-adhesive brushes however similar to those mentioned above, in other words provided with a handle ending with a pin on which the roll wrapped with a tape made of tissue paper or unwoven fabric wetted with a detergent/deodorant composition or with a medical composition for flea or tick stings (moreover, a non-adhesive tape) is arranged, are described in US20050066457.

SUMMARY OF THE INVENTION

The Applicant has currently found that the adhesive compositions containing specific concentrations range of a plasticizer are capable of completely removing not only acari, but even bacteria, moths, ticks, fleas, from fabrics and animal's hair.

In fact the applicant has found that, when the plasticizer is added in this amount range, is able to reduce the viscosity of the adhesive polymer, that becomes very fluid and is able to remove said micro-organisms or small insects, entrapping them, and, at the same time, it leaves no residue on the fabric or animal's hair.

The present invention therefore relates to a method for removing from tissue or animal's hair microorganisms such as acari and bacteria and small insects such as ticks, fleas and moths, comprising applying on said tissue or animal's hair and removing from the same an adhesive composition, containing an adhesive polymer and a plasticizer, wherein the plasticizer is contained in an amounts range able to satisfy the above targets.

The present invention further relates to adhesive compositions, further containing acaricidal, bactericidal, moth-preventing, tick-preventing and/or flea-preventing active ingredients in a concentration such that, once released from the adhesive composition to the fabric or animal's hair, they oppose the taking root of new organism colonies of the same type as those removed.

The present invention further relates to adhesive brushes containing the adhesive compositions of the invention.

DETAILED DESCRIPTION OF THE INVENTION

Figure 1:
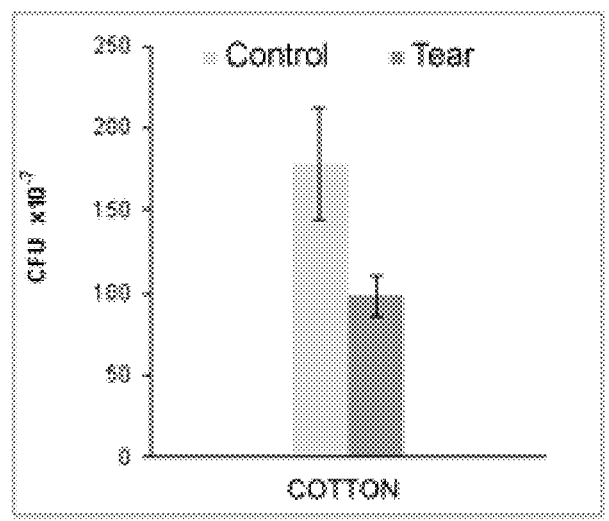
FIG. 1 reports statistical evaluation of the number of CFU of a laboratory strain *E. coli* jm109 present on cotton fabric before (control) and after treatment with adhesive stripes (tear).

Preferably the method of the invention encompasses that said adhesive composition is applied and removed almost contemporaneously, by means of an adhesive brush, comprising a handle and a pin on which a roll free to rotate on itself is placed, on which a support made of a suitable material is applied, on which the above said composition is further applied.

The adhesive compositions used in the method of the present invention are prepared by employing products which are generally already available on the market, such as for example water dispersions or adhesive polymer solutions in organic solvents.

In fact, the critical parameter for achieving the desired results is based on the amount of plasticizer which has to allow to obtain a very fluid, final adhesive having a high degree of tackiness in order to incorporate such a type of particles and contemporaneously not to leave any residue on the tissue or animal's hair.

The plasticizer content for the purposes of the invention is contained in the final adhesive composition at concentrations in the range of from about 5% to about 45% by weight of the total weight of the wet adhesive composition and, in all cases, such an amount is chosen in the said range and is a function of the viscosity of the final adhesive.

For the purposes of the present invention, as "weight of wet adhesive composition" it is meant the weight of the solution in organic solvent containing the adhesive polymer or the weight of the water dispersion containing the adhesive polymer.

The lower the adhesive viscosity, the smaller the plasticizer content to be added in order to achieve the desired results, instead the higher the viscosity of the final adhesive polymer, the greater the amount of plasticizer to be added.

When the adhesive composition used in the method of the invention is obtained from a solution in an organic, acrylic resin-based solvent for example, the amount of plasticizer is preferably in the range of from about 30% to about 40% by weight of the total weight of the wet adhesive composition.

When the adhesive composition is obtained from a solution in an organic, acrylic resin/natural or synthetic rubber-based solvent, the amount of plasticizer is preferably in the range of from about 15% to about 20% by weight of the total weight of the wet adhesive composition.

When the adhesive composition is obtained from a solution in an organic, styrene-butadiene copolymer-based solvent, the amount of plasticizer to reach the desired results is preferably in the range of from about 20% to about 25% by weight of the total weight of the wet adhesive composition.

When the adhesive composition is obtained from water, terpolymer (butyl acrylate/2-ethylhexyl acrylate/vinyl acetate)-based dispersions, the amount of plasticizer required for obtaining the desired results is in the range of from about 5% to about 45% by weight of the total weight of the wet adhesive composition.

When the adhesive composition is obtained from a water dispersion of a crosslinked acrylic acid polymer with isocyanate at a concentration of about 2% by weight of the total weight of the wet adhesive composition of said polymer (available on the market under the trade name Primal from Rohm and Haas), the amount of plasticizer is to be in the range of from about 10% to about 35% by weight of the total weight of the wet adhesive composition. The latter is also the preferred adhesive composition for the purposes of the present invention, as the adhesive is one of those usually employed for medical use, whereby it may contact not only the fabrics but even the skin without any problems.

According to a particularly preferred solution, the said adhesive composition, wherein the plasticizer is contained in an amount of about 12%, is employed.

The plasticizer is preferably chosen from triacetine and ethyl citrate, even more preferably is triacetine.

The adhesive compositions of the present invention contain acaricidal, bactericidal, moth-preventing, tick-preventing and/or flea-preventing active ingredients in a concentration such that, when they are released from the adhesive composition to the fabric or animal's hair, they oppose the taking root by new organism colonies of the same type as those removed.

The adhesive compositions for removing acari preferably contain from about 1% to about 20%, even more preferably from about 3% to about 10% by weight of the total weight of at least an acaricidal active ingredient.

According to a particularly preferred solution, essential oils chosen from *Pimpinella anisum, Foeniculum vulgare Juniperus Virginiana, Syzicium Aromaticum* and mixtures thereof are employed for such a purpose.

According to an even more preferred solution, a mixture of the said essential oils is employed.

When the composition of the invention contain an active ingredient having moth-proof activity it is preferably an essential oil selected from at least one of: *Cinnamomum canphora, Eucalyptus globulus, Lavandula, Juniperus virginiana, Cymbopogon flexuosus, Cymbopogon nardus.*

According to a particularly preferred embodiment a mixture containing all the above said oils is used.

When the compositions object of the present invention are used for removing bacteria, they may contain bactericidal substances preferably at concentrations in the range of 2-20% of the total weight of the dry adhesive composition, and are preferably chosen from at least one essential oil: *Thymus vulgaris, Eugenia caryophyllata, Citrus medica limonum.*

According to a particularly preferred embodiment a mixture containing all the above said oils is used.

When the composition according to the present invention is used for tick and/or flea proof it contains at least one essential oil selected from *Lavandula, Citrus medica limonum, Mentha arvensis*. According to a particularly preferred embodiment a mixture containing all the above said oils is used.

The adhesive compositions of this type, prepared by means of conventional-type methods which involve spreading the said aqueous dispersions or solutions in organic solvent of adhesive polymers on supports (made of cellulose, e.g. paper, but even of biodegradable or non biodegradable-type plastic and unwoven fabric-made supports), and subsequent passing through stoves or furnaces for removing the solvent, are used for preparing adhesive brushes adapted to remove acari, bacteria, moths, fleas and/or ticks.

Brushes of this type are comprised of a handle and a generally integrated pin around which a roll free to rotate on itself is arranged, on which the support made of a suitable material is wrapped, onto which the adhesive composition object of the invention is applied, containing the said active ingredients.

Therefore, this brush may be employed on fabrics such as of linings, sheets, sofas, pillows, floor coverings, carpets, clothes, sweaters, pullovers, etc.

Evaluation tests for the activity of removing acari moths and bacteria by means of the method of the present invention are hereinafter disclosed for illustrative and non limitative purpose.

Acari Remotion Test

Product Used for the Tests

For the tests, an adhesive brush is used, comprising a support made of plastic material on which a cardboard-made roll is free to rotate, around which a paper support is wrapped on which there is placed the adhesive composition obtained by mixing the aqueous dispersion of the crosslinked acrylic acid polymer with isocyanate at a concentration of about 2% by weight of the total weight of the wet adhesive composition of said polymer and available on the market under the trade name Primal and added with 12% triacetine by weight of the total weight of the wet adhesive composition and with vegetal essential oils, such as *Pimpinella anisum, Foeniculum vulgare Juniperus Virginiana, Syzicium Aromaticum*, as 1.4-1.52 g/m$^2$ of the total weight of the dry adhesive composition equal to 35-38 g/m$^2$ (4% by weight of the total weight of the dry adhesive composition).

The adhesive brush is rolled on the fabric by applying a slight pressure.

In this way, the foreign bodies present thereon are removed and the essentials oils which impregnate the so treated fabric are released.

Used Biological Material

Adult individuals of *Dermatophagoides pteronyssus* (house dust acarus) were used.

Treatment and Bioassay

A 25×25 cm cotton fabric cutting was treated with the above-defined adhesive brush and with the above-indicated modes. Four 6×12 cm strips were obtained from this cutting. 50 individuals of *Dermatophagoides pteronyssus* were inoculated at the centre of each of these strips, and a small amount of food was added. Biadhesive tape for preventing some acari from possibly escaping was glued at the edges of the strips. The strips were placed in containers made of plastic material in conjunction with a small container partially filled with water for ensuring a sufficient moisture. The same process was repeated by employing cotton fabric not treated with the adhesive brush (untreated control).

All the so obtained containers were placed to incubation in a climate-controlled cell at 25±1° C. and 70±5% RH for 24 hours. The acaricidal action was then checked by visually controlling the acarus vitality with a stereo microscope having 20 magnifications. The specimens which did not show any reaction upon a tactile stimulation were deemed to be dead.

In order to check whether the acari-preventing adhesive brush is capable to remove the acari from the fabric, the procedure below was followed.

The said cotton strips were treated with the adhesive brush again, still according the above-indicated employing modes. After having treated each single strip, the adhesive paper position was removed and glued on a transparent plastic support. The adhesive paper strips were then examined by means of the stereo microscope having 20 magnifications, thus detecting the number of both total acari collected from the adhesive support and those remained on the fabric.

Achieved Results

The number of alive and dead specimens is shown in the following tables. Mortality was corrected by using the Abbot's formula, as modified by Schneider Orelli, which allows to eliminate the animals which died a natural death:

[(% mortality of acari in a treated fabric–control % mortality of acari)/(100–control % mortality)]× 100.

TABLE 1

Mortality observed on *D. pteronyssus* after 24 hours from the treatment with the adhesive brush according to the present invention

| | Control (untreated fabric) | | | | Fabric treated with the brush | | |
|---|---|---|---|---|---|---|---|
| test | alive | dead | dead % | test | alive | dead | dead % |
| 1 | 49 | 1 | 2.00 | 1 | 40 | 10 | 20.00 |
| 2 | 45 | 5 | 10.00 | 2 | 43 | 6 | 12.24 |
| 3 | 46 | 4 | 8.00 | 3 | 47 | 3 | 6.00 |
| 4 | 48 | 1 | 2.04 | 4 | 38 | 11 | 22.45 |
| | | mean | 5.51 | | | mean | 15.17 |
| | | | | | | Abbott | 10.23 |

TABLE 2

Number of acari present in the adhesive brush of the invention and on the cotton fabric strips and percentage of individuals removed from the support

| Test | Acari on fabric | Acari on adhesive paper | Removed acari % |
|---|---|---|---|
| TNT* 1 | 0 | 50 | 100.00 |
| TNT* 2 | 0 | 50 | 100.00 |
| TNT* 3 | 1 | 49 | 98.00 |
| TNT* 4 | 1 | 48 | 97.96 |
| TPT** 1 | 0 | 50 | 100.00 |
| TPT** 2 | 1 | 48 | 97.96 |
| TPT** 3 | 0 | 50 | 100.00 |
| TPT** 4 | 0 | 49 | 100.00 |
| | | Mean | 99.24 |

*= fabric not treated with the adhesive brush
**= fabric previously treated with the adhesive brush Conclusions Under the experimental conditions reported herein, the adhesive brush of the invention shows a acaricidal activity which is established at 10% for the house dust acarus. On the other hand, the action of removing the acari from the treated support proved to be very high under the experimental conditions reported, thus leading to the removal of almost the whole of the individuals present.

Moths Remotion Test

Material and Methods

For the tests, an adhesive brush is used, comprising a support made of plastic material on which a cardboard-made roll is free to rotate, around which a paper support is wrapped on which there is placed the adhesive composition obtained by mixing the Primal aqueous dispersion used in the previous test added with triacetine 12% by weight, and added with essential oil moth consisting of a mixture of *Cinnamomum canphora, Eucalyptus globules, Lavandula, Juniperus virginiana, Cymbopogon flexuosus, Cymbopogon nardus*. This mixture is added in such amount that 2.5 g/m$^2$ are contained in 40 g/m$^2$ of wet adhesive composition.

Biological Material

*Tineolola Bisseliella* (clothes) moth maggots were used, coming from a laboratory consolidated colony, in an isolated environment from insecticidal contamination.

The species cycle from eggs to adult age at 25±1° C. and at 65±5% of RH (relative humidity) is complete in 45±5 days.

Treatment and Bioassay

A black wool cutting of 10×50 cm was previously treated with an aqueous mixture containing 10% beer yeast and 1% cholesterol. Three different cuttings of 10×10 cm are obtained from the above cutting. 10 just open clothes moth maggots (*Tineolola bisseliella*) were inoculated in the centre of each cutting. These cuttings were in part placed in glass Petri capsules (6 cm diameter), to allow the maggots colonization of the only portion of the cutting destined to the treatment.

The plates were then allowed to incubate in a conditioned closet at 25±1° C. and at 65±5% of RH for 20 days. Therefore the treatment was carried out with middle aged maggots provided with the respective sericeus food channels.

To verify the ability of the adhesive brush to remove maggots from clothes after passing the adhesive brushes on each cutting, the specific portion of paper containing the adhesive utilised for this treatment was removed and fixed to transparent glass. The adhesive paper stripes and the wool cuttings were analyzed at the stereo microscope at respectively 6.4 and 16 magnifications, measuring the number of maggots collected on the paper and those remained in the wool. The number of *Tineolola bisseliella* maggots removed by the tissue cuttings after treatment is reported in the following tables.

TABLE 1

Number of maggots present on the adhesive brush and on the wool cuttings and percentage of the maggots removed, after the first treatment lasted 40 seconds.

| Number of the cutting | Maggots on tissue | Maggots on the adhesive paper | % of removed maggots |
|---|---|---|---|
| 1 | 0 | 10 | 100 |
| 2 | 0 | 10 | 100 |
| 3 | 0 | 10 | 100 |

TABLE 2

Number of maggots present on the adhesive brush and on the wool cuttings and percentage of the maggots removed, after the second treatment lasted 40 seconds.

| Number of the cutting | Maggots on tissue | Maggots on the adhesive paper | % of removed maggots |
|---|---|---|---|
| 1 | 0 | 10 | 100 |
| 2 | 0 | 10 | 100 |
| 3 | 0 | 10 | 100 |

TABLE 3

Number of maggots present on the adhesive brush and on the wool cuttings and percentage of the maggots removed, after the third treatment lasted 40 seconds.

| Number of the cutting | Maggots on tissue | Maggots on the adhesive paper | % of removed maggots |
|---|---|---|---|
| 1 | 0 | 10 | 100 |
| 2 | 0 | 10 | 100 |
| 3 | 0 | 10 | 100 |

Under the experimental conditions above indicated, the adhesive brush of the invention revealed an excellent removal activity of the clothes moth (*Tineolola bisseliella*) from the treated tissue, so that the total removal of maggots present occurs already after the first treatment.

Test of Bacterial Removal.
Material and Methods

In order to evaluate the efficacy in removing bacteria from various tissue adhesive stripes of 10×15 cm were used containing the medical adhesive obtained by mixing the Primal aqueous dispersion used in the previous test and added with triacetine 12% by weight of the total weight of the wet adhesive composition.

Bacterial cultures of a laboratory strain (*E. coli* jm109) and environmental strain (mixed culture from domestic environment) were grown in a liquid LD enriched medium until reaching the stationary phase (o/n at 37° C. under stirring).

Then known amounts of $10^{-7}$ bacteria (100 µL) were plated on Petri dishes (solid LD enriched medium) and incubated for 1 hour at 37° C. for 1 hour.

With a reply/plating apparatus, further plates were replicated using a suitable sterile tissue (cotton, jeans, nylon, silk) and the new plates were incubated (o/n at 37° C. (Control). The colony formation unit (CFU) were then calculated for all plates, the difference between the CFU of the control plates and those of the plates following to the application and removal (tear) represents for each fabric an evidence of the removal efficacy of the vital cells from the surface of this fabric.

In order to have significant statistic results each experiment was repeated 5 times.

Results

Very thin fabric such as silk (data not reported) and cotton (FIGS. 1 and 2), wet considerably during the plates replication, therefore they do not result suitable for the experiment. In fact the adhesive stripes do not adhere to the wet tissue with the result that the adhesive stripe efficacy of removal is considerably reduced.

Figure 2:
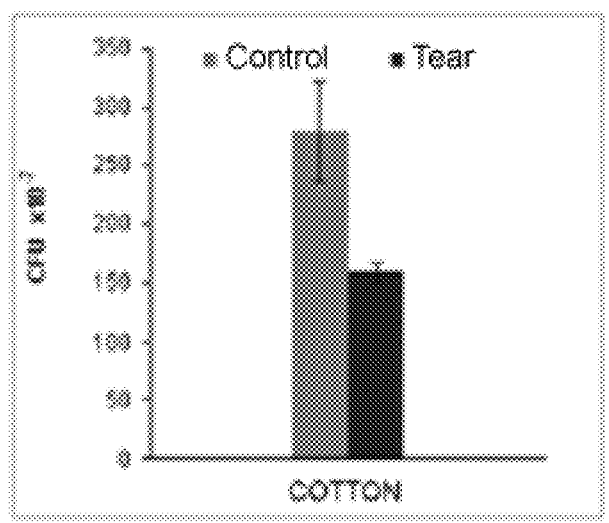
FIG. 2 reports statistical evaluation of the number of CFU of a mixed environmental culture present on cotton before (control) and after treatment with adhesive stripes (tear).

However in the case of cotton a discrete ability to remove bacteria is observed notwithstanding the tissue is completely wet and the application of the adhesive stripe results rather difficult. Under these condition about 45% of the vital cells are removed with *E. Coli* jm109 (FIG. 1), and with environmental mixed culture 43% (FIG. 2). Nonetheless these conditions are very far from those the final product in the form of adhesive brushes should be utilised.

Figure 3:
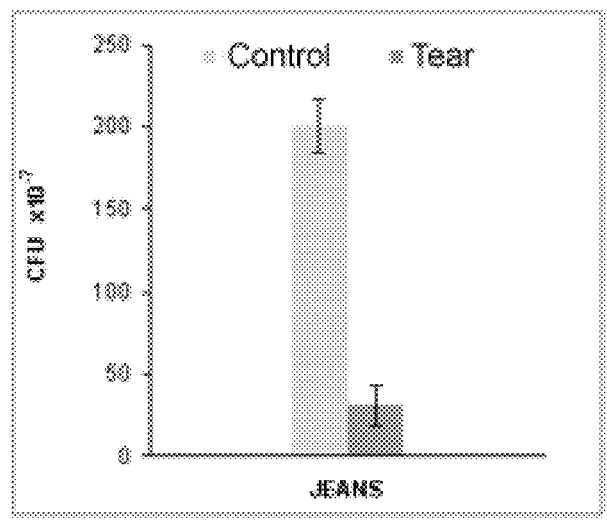
FIG. 3 reports statistical evaluation of the number of CFU of a laboratory strain *E. coli* jm109 present on jeans fabric before (control) and after treatment with adhesive stripes (tear).
Figure 4:
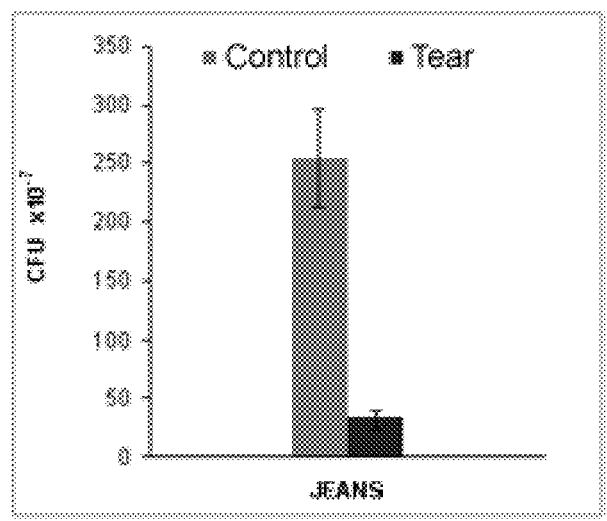
FIG. 4 reports statistical evaluation of the number of CFU of a mixed environmental culture present on jeans fabric before (control) and after treatment with adhesive stripes (tear).

Thicker fabric like jeans result more suitable for the experiment as after plates replication their surface do not result excessively wet and the application of the adhesive stripes is easier. As a consequence the removal ability of the adhesive stripes increases in a high degree, about 87% with environmental mixed culture (FIG. 4) and 85% with *E. Coli* jm109 (FIG. 3).

The use of an inert surface (nylon fabric) allows to determine the efficacy of a direct removal not caused by a material release by the same fabric.

Figure 5:
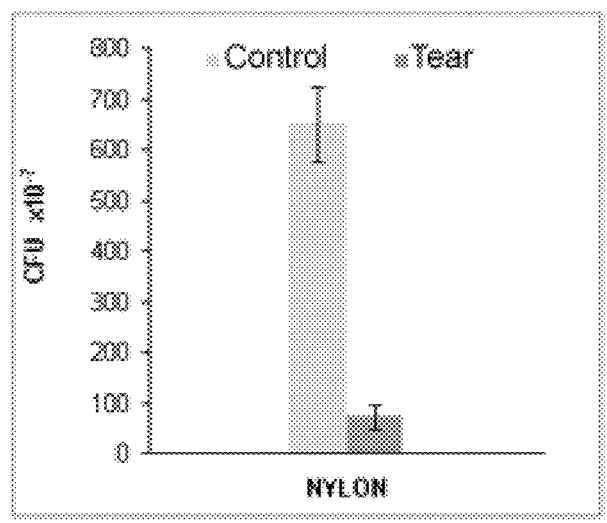
FIG. 5 reports statistical evaluation of the number of CFU of a laboratory strain *E. coli* jm109 present on nylon fabric before (control) and after treatment with adhesive stripes (tear).
Figure 6:
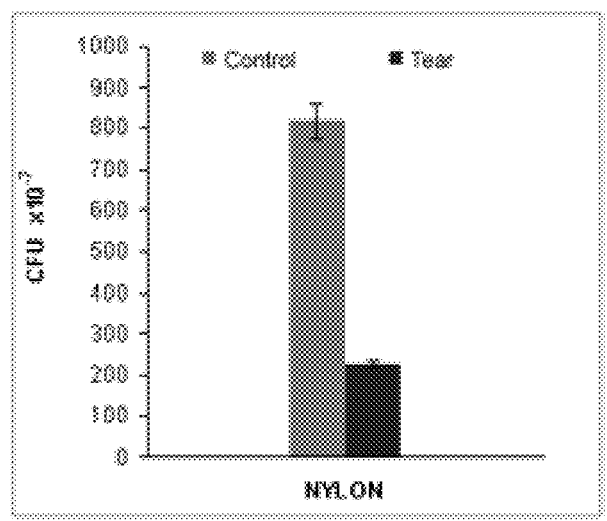
FIG. 6 reports statistical evaluation of the number of CFU of a mixed environmental culture present on nylon fabric before (control) and after treatment with adhesive stripes (tear).

Under these conditions the percentage of vital cells removed by a single tear is 89% with *E. Coli* jm109 culture (FIG. 5) and 72% with mixed culture (FIG. 6).

On the base of these results it is possible to conclude that adhesive stripes are able to remove from tissues and surfaces on average about 83% of vital cells with a maximum of 89% reached with nylon with a standard error of about 5%.

Moreover their ability is neither conditioned by the type of tissue (jeans and nylon give very similar results notwithstanding they were very different as material and consistency) nor by the bacterial type present (very similar results were obtained both with *E. Coli* jm109 culture and with mixed environmental culture).

Since the removal ability was determined considering the amount of vital cells present after the treatment with the adhesive stripes it was also important to investigate if this reduction effect of vital cells present was due exclusively to the adhesive action of the stripe (mechanical removal) or of the adhesive showed per se an antibacterial effect (chemical removal).

To this purpose the growth curve was also determined by measuring the absorbance of the laboratory strain *E. Coli* jm109 in a liquid LD enriched medium respectively in the absence and in the presence of different concentration of the adhesive: $6 \times 10^{-7}\%$, $5 \times 10^{-6}\%$, $2 \times 10^{-3}\%$, 0.02%

The results observed show that that the adhesive does not seem to have antimicrobial activity, since the curve of control is almost superimposed with those containing the adhesive. It was not possible to register the whole curve at adhesive concentrations higher than 0.02%, because of the intrinsic absorbance of the adhesive at these concentrations, however it was possible to detect the final growth point that results to be in the proximity of that reached with control cultures without adhesive.

In view of the above results we can conclude that the removal effect of vital cells of the adhesive stripes is only ascribable to their ability to remove mechanically bacteria.

The invention claimed is:

1. A method for removing microorganisms and small insects from fabric or animal's hair comprising
    a) applying an adhesive composition comprising at least one adhesive polymer and a plasticizer on said fabric or animal's hair by means of an adhesive brush comprising
        a handle;
        a pin;
        a roll free to rotate on itself and paced around said pin
        a support of suitable material applied around said roll and provided with said adhesive composition and
    b) removing said microorganisms and small insects from said fabric or said animal's hair, by removing said adhesive composition by means of said adhesive brush
    wherein said adhesive composition is obtained by
        adding the plasticizer to a solvent solution or an aqueous dispersion of said at least one adhesive polymer to obtain a wet adhesive composition, said plasticizer being in an amount of from 5% to 45% by weight of a total weight of said wet adhesive composition
        applying said wet adhesive composition on said support of a suitable material of said adhesive brush; and
        removing from said composition said organic solvent or water to obtain said adhesive composition.

2. The method according to claim 1, wherein said microorganisms are selected from the group consisting of: acari and bacteria.

3. The method according to claim 1, wherein said small insects are selected from the class consisting of moths, ticks, fleas.

4. The method according to claim 1, wherein said wet adhesive composition is obtained from a composition selected from the group consisting of:
    a) an organic solvent solution, containing, as the adhesive polymer, an acrylic resin,
    b) an organic solvent solution, containing, as the adhesive polymer, an acrylic resin/natural or synthetic rubber,
    c) an organic solvent solution containing, as the adhesive polymer, a styrene-butadiene copolymer,
    d) an aqueous dispersion containing as the adhesive polymer: butyl acrylate/2-ethylhexyl acrylate/vinyl acetate terpolymer,
    e) an aqueous dispersion containing as the adhesive polymer a crosslinked acrylic acid polymer with isocyanate at a concentration of 2% by weight of the total weight of said wet adhesive composition.

5. The method according to claim 1, wherein said plasticizer is chosen from the class consisting of triacetine and ethyl citrate.

6. The method according to claim 4, wherein, when the wet adhesive composition is obtained from the composition of (a), the plasticizer is contained in amounts ranging from 30% to 40% by weight of the total weight of said wet adhesive composition.

7. The method according to claim 4, wherein, when the wet adhesive composition is obtained from the composition of (b), the plasticizer is contained in amounts ranging from 15% to 20% by weight of the total weight of said adhesive wet composition.

8. The method according to claim 4, wherein, when the wet adhesive composition is obtained from the composition of (c), the plasticizer is contained in amounts ranging from 20% to 25% by weight of the total weight of said adhesive wet composition.

9. The method according to claim 4, wherein, when the wet adhesive composition is obtained from the composition of (d), the plasticizer is contained in amounts ranging from 5% to 40% by weight of the total weight of said wet adhesive composition.

10. The method according to claim 4, wherein, when the wet adhesive composition is obtained from the composition of (e), the plasticizer is contained in amounts ranging from 10% to 35% by weight of the total weight of the wet adhesive composition.

11. The method of claim 4, wherein the wet adhesive composition is obtained by the composition of (e).

12. The method according to claim 10, wherein the plasticizer amount is of 12% by weight of the total weight of the wet adhesive composition.

* * * * *